United States Patent [19]
Korshak et al.

[11] 3,821,112
[45] June 28, 1974

[54] HEAT-RESISTANT ANTIFRICTION POLYMERIC MATERIAL

[76] Inventors: Vasily Vladimirovich Korshak, ulitsa Gubkina 4, kv. 81; Kuzma Andrianovich Andrianov, Vystavochny pereulok 3, kv. 9; Irina Alexandrova Gribova, ulitsa Vavilova 12, kv. 31; Alexandr Petrovich Krasnov, prospekt Kalinina 31, kv. 28; Lotary Mikhailovich Khananashvili, Sumskaya ulitsa 6, korpus 2, kv. 244; Tatyana Vsevolodovna Vasilieva, ulitsa Volgina 9, korpus 2, kv. 96, all of Moscow; Georgy Vasilievich Elerdashvili, ulitsa Barnova 137, kv. 66, Tbilisi; Galina Ilinichna Gureeva, ulitsa Molostovykh 11, korpus 5, kv. 18, Moscow; Valery Mikhailovich Kotov, Nagatinskaya Naberezhnaya 34, kv. 260, Moscow; Rostislav Lazarevich Brontman, Dubninskaya ulitsa 1, kv. 76, Moscow, all of U.S.S.R.

[22] Filed: Mar. 20, 1973

[21] Appl. No.: 343,166

[30] Foreign Application Priority Data
Mar. 20, 1972  U.S.S.R............................ 1761760

[52] U.S. Cl............................... 252/12.4, 252/12
[51] Int. Cl............................................. C10m 7/50
[58] Field of Search........... 252/12, 12.2, 12.4, 12.6

[56] References Cited
UNITED STATES PATENTS

| | | | |
|---|---|---|---|
| 2,703,768 | 3/1955 | Hall | 252/12 |
| 3,424,678 | 1/1969 | Morway et al. | 252/13 |
| 3,467,596 | 9/1969 | Hermann | 252/12 |
| 3,509,050 | 4/1970 | Korehak et al. | 252/12 |

Primary Examiner—Daniel E. Wyman
Assistant Examiner—J. Vaughn
Attorney, Agent, or Firm—Holman & Stern

[57] ABSTRACT

A heat-resistant antifriction polymeric material comprising a polymer binder and a filler, wherein the polymer binder is a product of curing a mixture of polyphenylenephenylsiloxane and phenolphthalein phenolformaldehyde oligomers taken in a weight ratio of 80-20:20-80, and the filler which is self-lubricating or a mixture thereof with other fillers. The content of the polymer binder in said material is from 7 to 60 percent by weight, and the content of the filler is 93 to 40 percent by weight.

Articles made from said antifriction material feature high heat resistance and serviceability in the absence of a lubricating liquid at temperatures of up to +350°C, exhibiting at the same time high strength and hardness.

5 Claims, No Drawings

HEAT-RESISTANT ANTIFRICTION POLYMERIC MATERIAL

The present invention relates to antifriction materials, and more particularly to heat-resistant antifriction polymeric materials.

Such materials are widely used in various fields of mechanical engineering wherever it is necessary to employ components operating under friction conditions with little or no lubricating liquid.

Heat-resistant antifriction polymeric materials containing a polymer binder and a self-lubricating filler, and wherein the binder is cured phenolphthalein phenol-formaldehyde resin are known in the art.

Also known are antifriction materials wherein polyarylates, polyimides are used as binders, together with various fillers.

One of the basic disadvantages inherent in the prior art materials is their insuffient heat resistance: a marked increase in the coefficient of friction of from 0.08 to 0.15 is observed even at temperatures of from 100° to 140°C. Upon prolonged exposure to a temperature of 250°C, the material is progressively degraded, thus causing the articles being produced to lose weight, show poor serviceability and, ultimately, break down completely.

It is therefore an object of the present invention to provide an antifriction polymeric material having high heat resistance in combination with improved physical and mechanical properties.

This object is attained in a heat-resistant antifriction polymeric material based on a cured polymer binder and a self-lubricating filler, wherein, according to the invention, the polymer binder used is a product of curing of a mixture of polyphenylenephenylsiloxane and phenolphthalein phenol-formaldehyde oligomers taken in a weight ratio of 80-20:20-80.

The content of the filler in the proposed material may vary within a sufficiently wide range, its exact amount depending upon the required properties of the articles to be produced. The recommended content of the polymer binder and the filler in the proposed antifriction material is 7 to 60 and 93 to 40 percent by weight, respectively.

Said polyphenylenephenylsiloxane oligomer is a known product per se of co-hydrolysis of phenyl trichlorosilane

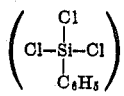

and 1,4-bis(phenylchlorosilyl)

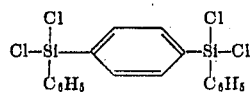

Co-hydrolysis is effected under mild conditions at 30° to 50°C in a toluene-acetone medium and in the presence of a hydrogen chloride acceptor.

The polyphenylenephenylsiloxane oligomer thus obtained is characterized in that its main chain consists of phenylenesiloxane units having peripheral phenyl groups at the silicon moiety, having a branched structure and containing hydroxyl groups. The presence of the aromatic rings and the silicon atoms in the macromolecular chain of this oligomer ensures its high heat resistance, weile the presence of the hydroxyl groups in the chain of the polyphenylenephenylsiloxane oligomer provides for its high reactivity.

The phenolphthalein phenol-formaldehyde oligomer is a product of the copolycondensation of phenol, phenolphthalein and formaldehyde in the presence of an alkaline catalyst, with the molar ratio between the phenols and formaldehyde being 1:1.2 and the amount of the phenolphthalein with respect to the total weight of the phenols being 40 percent by weight.

The phenolphthalein phenol-formaldehyde oligomer thus obtained is used as the binding component of the proposed antifriction material.

The filler in said material may be any self-lubricating filler belonging to the group of solid lubricants including graphite, molybdenum disulphide, boron nitride, etc.

Said fillers enter into the composition of the herein disclosed antifriction material separately, in combination with one another and with other fillers not belonging to the group of solid lubricants, but not affecting the heat resistance and strength of the material either, such as heat-resistant graphitized fabric materials and metallic powders.

The method of producing the proposed antifriction material and articles made therefrom comprises known methods of producing combined plastics and their processing, and includes the following steps:

1. preparation of the polymer binder;
2. preparation of a molding composition of the antifriction material;
3. production of articles from said molding composition.

The first step consists of mixing the organosilicon oligomer with the phenolphthalein phenol-formaldehyde oligomer. Mixing a solution of the polyphenylenephenylsiloxane oligomer in toluene with that of the phenolphthalein phenol-formaldehyde oligomer in acetone results in their being mutually dissolved in order to form a mixture. This mixture is later used for preparing a composition in the form of a solution, as well as a powder which is obtained by eliminating the solvent from the solution mixture.

The second step, which is the preparation of a molding composition, consists either in impregnating fibrous fillers, for example, carbonized cloth, with the oligomer solution mixture containing a suspension of the powder-like fillers, or in mixing of the dry powdered oligomer mixture with the powder-like fillers using an agitating means such as a vibrating mill.

It is recommended that the molding composition prepared by impregnating fibrous fillers with the oligomer solution mixture be dried prior to processing in order to eliminate the solvents.

The antifriction material composition prepared by using the oligomer mixtures in the form of a solution or as a finely divided powder is processed by molding at temperatures ranging from 250° to 350°C and under pressures of from 500 to 1,000 kg/cm².

The proposed antifriction materials are characterized, according to the invention, by the following features: high heat resistance and serviceability in the absence of a lubricating liquid at temperatures as high as +350°C. Besides, these materials also feature high strength, an impact resilience of 6 kg·cm/cm² and a hardness of 20 kg/mm².

The combination of high heat resistance having sufficient strength is especially essential for components used in various critical friction, rocking and sliding units.

Another advantage of the proposed material resides in the ease of its manufacture. This material can also be easily processed into articles by using known production methods on conventional equipment employed in the manufacture of plastics.

Both the polyphenylenephenylsiloxane and the phenolphthalein phenol-formaldehylde binders used in this material are readily available products.

For a better understanding of the present invention, reference will now be made to examples of compositions of the proposed material and test results.

EXAMPLE 1

A 50 percent solution of a polyphenylenephenylsiloxane oligomer (I) in toluene is mixed with a 50 percent solution of phenolphthalein phenol-formaldehyde oligomer (II) in acetone, with both oligomers being taken in a weight ratio of 80-20:20-80. Then, the mixture of both oligomer solutions is dried and ground in a mortar. The polymer powder thus obtained is mixed with powder-like self-lubricating fillers, such as graphite and molybdenum disulphide. The content of the components is given in Table 1.

Table 1

| No. | Weight ratio of the oligomers in the solution, % I : II | Graphite, weight % | Molybdenum disulphide, weight % |
|---|---|---|---|
| 1. | 40 / 80 : 20 | 60 | — |
| 2. | 30 / 21 : 79 | 70 | — |
| 3. | 20 / 50 : 50 | 60 | 20 |
| 4. | 35 / 20 : 80 | 45 | 20 |

The mixture of the oligomers with the fillers is pressed in molds at temperatures ranging from 250° to 350°C under pressures of from 500 to 1,000 kg/cm$^2$, the result of which being that said oligomers are cured.

After molding, the finished antifriction material wherein the binder is a product of curing of said oligomers, is used in the manufacture of various antifriction components. One of such components is a bushing which was tested under sliding conditions at a speed of 2 m/sec and under a load of 2 kg/cm$^2$ in the absence of any lubricating liquid. Throughout the test, the coefficient of friction remained constant (0.08) up to a temperature as high as 320°C.

EXAMPLE 2

A 50 percent solution of polyphenylenephenylsiloxane oligomer (I) in toluene is mixed with a 50 percent solution of phenolphthalein phenol-formaldehyde oligomer (II) in acetone, with both oligomers being taken in a weight ratio of 80:20. Then powdered molybdenum disulphide is added to the solution thus obtained and the resulting suspension is used to impregnate a carbonized cloth. The content of the components in the composition is as follows: oligomer mixture — 35 percent by weight, molybdenum disulphide — 30 percent by weight, carbonized cloth — 35 percent by weight. Once impregnated, the carbonaceous cloth is dried at 100°C for 2 hours. Prior to manufacturing the antifriction articles, the impregnated cloth is pressed in molds at temperatures ranging from 250° to 350°C and under pressures of from 500 to 100 kg/cm$^2$, the process of molding being accompanied by the curing of the oligomers.

A manufactured article, a sliding bushing, had a hardness of 18 to 20 kg/cm$^2$ and performed well at temperatures of from 270° to 300°C, under a load of 100 kg/cm$^2$ and at a speed of 10 m/sec.

EXAMPLE 3

A mixture of the oligomers (I) and (II) of the solution of Example 2 is used to impregnate powdered and fibrous fillers. The characteristics of this material are given in Table 2.

Table 2

| No. | Weight ratio of the oligomers in the solution, % I : II | Molybdenum disulphide, weight % | Graphite, weight % | Carbonized cloth wt. % | Boron nitride, weight % |
|---|---|---|---|---|---|
| 1. | 40 / 80 : 20 | 20 | 5-15 | 10-32 | 3-15 |
| 2. | 60 / 80 : 20 | 20 | 5 | 12 | 3 |

After the composition has dried, it is molded at temperatures of from 250 to 320°C under pressures of from 500 to 1,000 kg/cm$^2$. The sliding components manufactured from this material perform well under oilless operating conditions at temperatures of from 300° to 320°C.

EXAMPLE 4

A mixture of the oligomers (I) and (II) of the solution of Example 2 is dried, ground in a mortar and mixed with powdered fillers whose content is given in Table 3.

The resulting material contains 7 to 60 percent by weight of the oligomer mixture, 30 to 68 percent by weight of a self-lubricating filler and 10 to 25 percent by weight of metallic powder.

The composition is cured at 250° to 350°C under a pressure of 1,000 kg/cm$^2$. An article made from this material possesses a hardness of 12 to 13 kg/cm$^2$. At a speed of 2 m/sec and under a load of 2 kg/cm$^2$, this article retains a stable and invariable coefficient of friction, which is 0.08, up to a temperature of 240°C.

What is claimed is:

1. A heat-resistant antifriction polymeric material comprising a polymer binder which is a product of curing of a mixture of polyphenylenephenylsiloxane and phenolphthalein phenol-formaldehyde oligomers taken in a weight ratio of 80-20:20-80, respectively, and a self-lubricating inorganic filler, said material contain- Table 3

| No. | Weight ratio of the oligomers in the solution, % I : II | Graphite, weight % | Molybdenum di-sulphide, weight % | Copper powder, weight % | Silver powder, weight % | Boron nitride, weight % |
|---|---|---|---|---|---|---|
| 1. | 7-50/80 : 20 | 20-43 | 20-40 | 10 | — | — |
| 2. | 7-60/80 : 20 | 20-43 | — | — | — | 20-50 |
| 3. | 7-60/80 : 20 | 5-20 | 25-48 | — | 10-25 | — |
| 4. | 7-60/80 : 20 | 5-20 | 25-48 | — | 10-25 | — | ing from 7 to 60 percent by weight of the cured product of said oligomer mixture and from 93 to 40 percent by weight of the filler.

2. A heat-resistant antifriction polymeric material as claimed in claim 1, wherein the self-lubricating filler is selected from the group consisting of powdered graphite, molybdenum disulphide, boron nitride, and mixtures thereof.

3. A heat-resistant antifriction polymeric material as claimed in claim 1, further comprising a filler selected from the group consisting of carbonized cloth, graphitized cloth, and metallic powders.

4. A heat-resistant antifriction polymeric material as claimed in claim 1, containing from 7 to 60 percent by weight of the product of curing of said oligomer mixture, from 30 to 68 percent by weight of the self-lubricating filler, and from 10 to 25 percent by weight of the metallic powder.

5. A heat-resistant antifriction polymeric material as claimed in claim 1, containing 35 percent by weight of the oligomer mixture, 30 percent by weight of molybdenum disulphide, and 35 percent by weight of the carbonized cloth.

* * * * *